(12) United States Patent
Hong (10) Patent No.: US 11,432,361 B2
(45) Date of Patent: Aug. 30, 2022

(54) METHOD AND APPARATUS FOR CONFIGURING UE INFORMATION, BASE STATION AND CORE NETWORK DEVICE

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/472,532

(22) PCT Filed: Dec. 26, 2016

(86) PCT No.: PCT/CN2016/112076
§ 371 (c)(1),
(2) Date: Jun. 21, 2019

(87) PCT Pub. No.: WO2018/119567
PCT Pub. Date: Jul. 5, 2018

(65) Prior Publication Data
US 2019/0327786 A1 Oct. 24, 2019

(51) Int. Cl.
*H04W 76/11* (2018.01)
*H04W 36/00* (2009.01)
(Continued)

(52) U.S. Cl.
CPC ....... *H04W 76/27* (2018.02); *H04W 36/0033* (2013.01); *H04W 68/005* (2013.01); *H04W 76/11* (2018.02)

(58) Field of Classification Search
CPC ............. H04W 36/0033; H04W 68/00; H04W 68/005; H04W 76/11; H04W 76/27; H04W 68/06
See application file for complete search history.

(56) References Cited

U.S. PATENT DOCUMENTS

2013/0215834 A1 8/2013 Deivasigamani et al.
2013/0260811 A1* 10/2013 Rayavarapu .......... H04W 76/19
455/509
(Continued)

FOREIGN PATENT DOCUMENTS

CN 104247539 A 12/2014
CN 105898894 A 8/2016
(Continued)

OTHER PUBLICATIONS

International Search Report (including English translation) and Written Opinion issued in PCT/CN2016/112076, dated Jun. 13, 2017, 8 pages.
(Continued)

*Primary Examiner* — Kevin C. Harper
*Assistant Examiner* — Derrick V Rose
(74) *Attorney, Agent, or Firm* — Arch & Lake LLP (57) ABSTRACT

Methods and apparatuses are provided for configuring UE information. The method may include: after UE is controlled to switch from an RRC connected state to an RRC inactive state, a radio notification area is determined, where the radio notification area indicates a set of one or more cells and the UE in the RRC inactive state moving among the cells in the radio notification area does not cause a cell handover; and UE information of the UE is sent to all base stations within the radio notification area. The UE information of the UE in the RRC inactive state is synchronously configured to other base stations within the radio notification area, such that the base stations may accurately and efficiently determine the RRC state of the UE, thereby improving the transmission efficiency between the base station and the UE.

9 Claims, 5 Drawing Sheets

(51) Int. Cl.
*H04W 76/27* (2018.01)
*H04W 68/00* (2009.01)

(56) References Cited

U.S. PATENT DOCUMENTS

| | | |
|---|---|---|
| 2015/0373608 A1 | 12/2015 | Zhu et al. |
| 2016/0330612 A1 | 11/2016 | Mildh |
| 2018/0092157 A1* | 3/2018 | Chen ..................... H04W 76/27 |
| 2019/0174365 A1* | 6/2019 | Li ..................... H04W 36/0033 |
| 2019/0246445 A1* | 8/2019 | Centonza .............. H04W 76/27 |

FOREIGN PATENT DOCUMENTS

| | | |
|---|---|---|
| WO | 2014182210 A1 | 11/2014 |
| WO | 2015085273 A1 | 6/2015 |

OTHER PUBLICATIONS

Intel Corporation,"Discussion on RAN notification area for the new RRC state", 3GPP TSG RAN WG2 Meeting #96, Reno, USA, R2-168524, Nov. 14-18, 2016, (3p).
State Intellectual Property Office of the People's Republic of China, Second Office Action and Search Report Issued in Application No. 201680001882.0, dated Jun. 24, 2021, with English translation, (15p).

* cited by examiner

METHOD AND APPARATUS FOR CONFIGURING UE INFORMATION, BASE STATION AND CORE NETWORK DEVICE

CROSS REFERENCE TO RELATED APPLICATIONS

[0001] The present application is the U.S. national phase of PCT Application No. PCT/CN2016/112076 filed on Dec. 26, 2016, which is incorporated herein by reference in its entirety.

TECHNICAL FIELD

The present disclosure relates to the field of communications technologies, and in particular, to a method and an apparatus for configuring UE information, a base station and a core network device.

BACKGROUND

In the Long Term Evolution (LTE) system, two Radio Resource Control (RRC) states are defined for User Equipment (UE), which are respectively an idle state and a connected state. When the UE needs to process a service, the UE may establish an RRC connection with the mobile communication network, that is, the RRC state is switched to the connected state from the idle state, and then transmit the service data to a network side device. During the process in which the UE is switched to the connected state from the idle state, more signaling overhead may be generated and the time taken is relatively long, thereby causing a relatively long data transmission delay.

In the related art, in the research and discussion of the 5-th Generation (5G) mobile communication technology project, the UE may also have an RRC inactive state in addition to the RRC idle state and the RRC connected state. When the UE is in the RRC inactive state, the base station may store context information of the UE. Therefore, during the process in which the UE is switched to the RRC connected state from the RRC inactive state, the generated signaling overhead is less and the time taken is short. In the related art, when the UE in the RRC inactive state is moved to a target cell from a source cell, during a process in which the UE is switched to the RRC connected state from the RRC inactive state, the generated signaling overhead is more, and a base station for the target cell cannot flexibly and accurately control the UE to switch to the RRC connected state from the RRC inactive state at an appropriate time, reducing the transmission efficiency of the service data of the UE.

SUMMARY

To overcome the problems in the related art, examples of the present disclosure provide a method and an apparatus for configuring UE information, a base station and a core network device. In this way, the UE information of the UE in the RRC inactive state is synchronously configured to other base stations within the radio notification area, such that the base stations within the radio notification area may accurately and efficiently determine the RRC state of the UE, thereby improving the transmission efficiency of the service data between the base station and the UE.

According to a first aspect of examples of the present disclosure, a method of configuring UE information is provided, which is applied to a source base station and includes:

after UE is controlled to switch from an RRC connected state to a RRC inactive state, determining a radio notification area, wherein the radio notification area is used to indicate a set of one or more cells and the UE in the RRC inactive state moving among the cells in the radio notification area does not cause a cell handover; and sending UE information of the UE to all base stations within the radio notification area.

In an example, sending the UE information of the UE to all base stations within the radio notification area includes:

when at least one base station within the radio notification area does not have an inter-base-station interface with the source base station, sending a first notification message to a core network device for instructing the core network device to send the UE information of the UE to all base stations within the radio notification area.

In an example, sending the UE information of the UE to all base stations within the radio notification area includes:

when at least one base station within the radio notification area does not have an inter-base-station interface with the source base station, sending a second notification message to a core network device for instructing the core network device to send the UE information of the UE to the at least one base station; and sending the UE information of the UE to other base stations within the radio notification area except the at least one base station through inter-base-station interfaces.

In an example, sending the UE information of the UE to all base stations within the radio notification area includes:

when each of the base stations within the radio notification area has an inter-base-station interface with the source base station, sending the UE information of the UE to each of the base stations within the radio notification area through the inter-base-station interface between the base station and the source station.

In an example, the UE information of the UE is UE identification information to identify the UE, or context information of the UE.

According to a second aspect of examples of the present disclosure, a method of configuring UE information is provided, which is applied to a core network device and includes:

receiving a notification message sent by a source base station;

acquiring UE information of UE and base station identification information of a to-be-notified base station within a radio notification area from the notification message, where the radio notification area is used to indicate a set of one or more cells, and the UE in a Radio Resource Control (RRC) inactive state moving among the cells in the radio notification area does not cause a cell handover; and sending the UE information of the UE to the to-be-notified base station.

In an example, the UE information of the UE is UE identification information to identify the UE, or context information of the UE.

According to a third aspect of examples of the present disclosure, an apparatus for configuring UE information is provided, which is applied to a source base station and includes:

an area determining module, configured to determine a radio notification area after UE is controlled to transit from an RRC connected state to an RRC inactive state, where the radio notification area is used to indicate a set of one or more cells and the UE in the RRC inactive state moving among the cells in the radio notification area does not cause a cell handover; and a first sending module, configured to send UE information of the UE to all base stations within the radio notification area.

In an example, the first sending module includes:

a first sending sub-module, configured to send a first notification message to a core network device for instructing the core network device to send the UE information of the UE to all base stations within the radio notification area when at least one base station within the radio notification area does not have an inter-base-station interface with the source base station.

In an example, the first sending module includes:

a second sending sub-module, configured to send a second notification message to a core network device for instructing the core network device to send the UE information of the UE to at least one base station when the at least one base station within the radio notification area does not have an inter-base-station interface with the source base station; and a third sending sub-module, configured to send the UE information of the UE to other base stations within the radio notification area except the at least one base station through inter-base-station interfaces.

In an example, the first sending module includes:

a fourth sending sub-module, configured to, when each of the base stations within the radio notification area has an inter-base-station interface with the source base station, send the UE information of the UE to each of the base stations within the radio notification area through the inter-base-station interface between the base station and the source station.

In an example, the UE information of the UE is UE identification information to identify the UE, or context information of the UE.

According to a fourth aspect of examples of the present disclosure, an apparatus for configuring UE information is provided, which is applied to a core network device and includes:

a receiving module, configured to receive a notification message sent by a source base station;

an analyzing module, configured to acquire UE information of UE and base station identification information of a to-be-notified base station within a radio notification area from the notification message, where the radio notification area is used to indicate a set of one or more cells, and the UE in a Radio Resource Control (RRC) inactive state moving among the cells in the radio notification area does not cause a cell handover; and a second sending module, configured to send the UE information of the UE to the to-be-notified base station.

In an example, the UE information of the UE is UE identification information to identify the UE, or context information of the UE.

According to a fifth aspect of examples of the present disclosure, a base station is provided, which includes:

a processor; and a memory configured to store processor-executable instructions;

where the processor is configured to:

after UE is controlled to switch from an RRC connected state to an RRC inactive state, determine a radio notification area, where the radio notification area is used to indicate a set of one or more cells and the UE in the RRC inactive state moving among the cells in the radio notification area does not cause a cell handover; and send UE information of the UE to all base stations within the radio notification area.

According to a sixth aspect of examples of the present disclosure, a core network device is provided, which includes:

a processor; and a memory configured to store processor-executable instructions;

where the processor is configured to:

receive a notification message sent by a source base station;

acquire UE information of UE and base station identification information of a to-be-notified base station within a radio notification area from the notification message, where the radio notification area is used to indicate a set of one or more cells, and the UE in a Radio Resource Control (RRC) inactive state moving among the cells in the radio notification area does not cause a cell handover; and send the UE information of the UE to the to-be-notified base station.

The technical scheme provided in examples of the present disclosure may include the following beneficial effects:

After the source base station controls the UE to switch to the RRC inactive state from the RRC connected state, the source base station determines a radio notification area and notifies the UE information of the UE in the RRC inactive state to all the base stations within the radio notification area. Since the UE information of the UE in the RRC inactive state is obtained by all the base stations within the radio notification area in the present disclosure, when the UE moves among the cells within the radio notification area and needs to be switched to the RRC connected state, the base station for any one of the cells in which the UE is located may control the UE to switch to the RRC connected state with relatively less interaction signaling. In this way, the UE in the RRC inactive state is quickly and efficiently switched to the RRC connected state, thereby improving the transmission efficiency of the service data for the UE.

It shall be appreciated that the above general descriptions and the following detailed descriptions are merely illustrative and explanatory and cannot limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Examples will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The technical solution provided by the present disclosure is applicable to a new generation network, such as a 5G network. The RRC state of the UE in the new generation network includes: an RRC inactive state, an RRC connected state and an RRC idle state. In the RRC inactive state, the UE may perform data transmission of a small amount of data with the base station, and the base station may store context information of the UE. The time taken by the UE to enter the RRC connected state from the RRC inactive state is shorter than the time taken by the UE to enter the RRC connected state from the RRC idle state, and the interaction signaling associated with entering the RRC connected state from the RRC inactive state is less than the interaction signaling associated with entering the RRC connected state from the RRC idle state, so that the UE may quickly enter the RRC connected state from the RRC inactive state and the signaling overhead is reduced. In addition, the new generation network also supports a radio notification area, which may be understood as a set of one or more cells, and UE in the RRC inactive state moving among the cells in the radio notification area does not cause a cell handover.

Figure 1A:
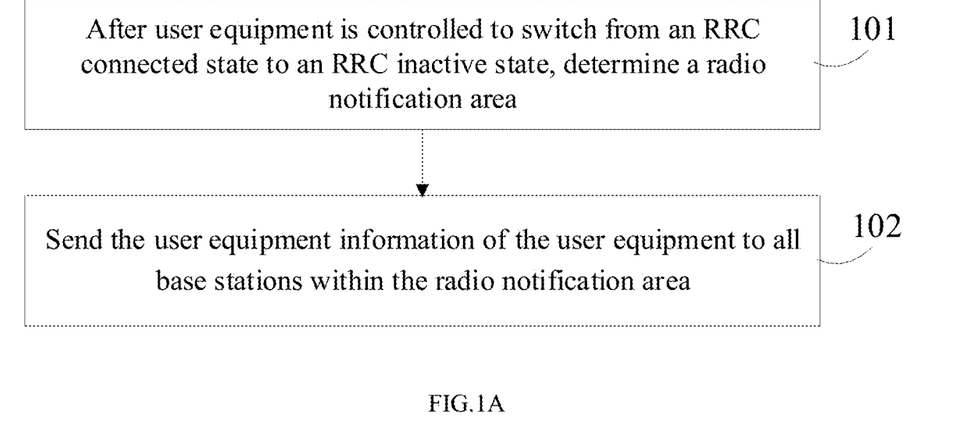
FIG. 1A is a flowchart of a method of configuring UE information according to an example.
Figure 1B:
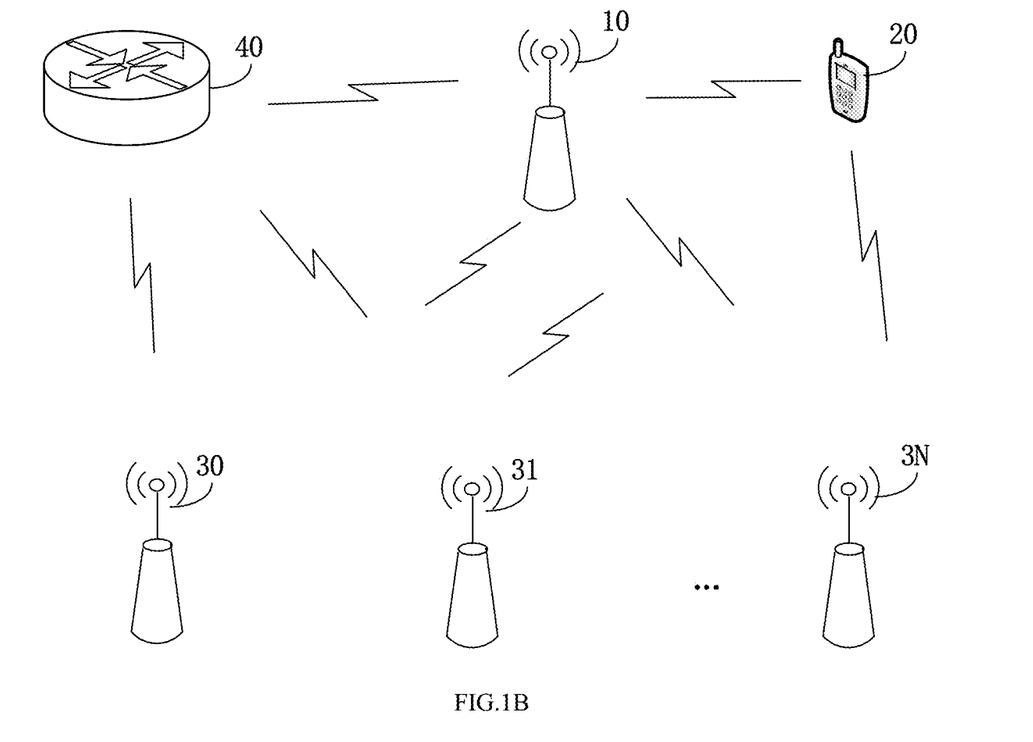
FIG. 1B is schematic diagram of a scenario of a method of configuring UE information according to an example.

FIG. 1A is a flowchart of a method of configuring UE information according to an example. FIG. 1B is a schematic diagram of a scenario of a method of configuring UE information according to an example. The method of configuring UE information may be applied to a source base station. As shown in FIG. 1A, the method of configuring UE information includes the following steps 101-102.

At step 101, after UE is controlled to switch to an RRC inactive state from an RRC connected state, a radio notification area is determined.

In an example, the radio notification area is used to indicate a set of one or more cells, and the UE in the RRC inactive state moving among the cells in the radio notification area does not cause a cell handover.

In an example, the radio notification area may be pre-divided by the system and each base station has a corresponding radio notification area.

In still another example, the radio notification area may be determined by a source base station according to a rule preset by the system. For example, if the system presets that an area within 1000 meters around the source base station is determined as a coverage of the radio notification area, the source base station may determine the area within 1000 meters around itself as the radio notification area; or if the system presets that neighboring cells adjacent to the cell in which the source base station is located is determined as a coverage of the radio notification area, the source base station may determine an area covered by the neighboring cells as the radio notification area.

In an example, the base station may further store the coverage of the radio notification area in the memory after determining the radio notification area for the first time, and then directly access the memory to obtain the radio notification area when the radio notification area is to be determined.

At step 102, UE information of the UE is sent to all base stations within the radio notification area.

In an example, the UE information of the UE may be identification information of the UE, such as an International Mobile Subscriber Identification Number (IMSI) of the UE.

In an example, the UE information of the UE may also be context information of the UE, including but not limited to any one or more of the following: a capability of the UE, authentication information, a negotiated security algorithm, a generated key, created connection information, bearer information, and so on.

In an example, the process of sending the UE information of the UE to all the base stations within the radio notification area may refer to examples shown in FIG. 2-FIG. 4, which will be described later.

In an exemplary scenario, as shown in FIG. 1B, take a mobile network being a 5G network as an example for illustration. The scenario shown in FIG. 1B includes a source base station 10, UE 20, base stations 30, 31, . . . , 3N within a radio notification area and a core network device 40. When UE corresponding to the source base station 10 is switched to the RRC inactive state, the source base station 10 may determine a radio notification area for the UE. When each of the base stations within the radio notification area has an inter-base-station interface with the source base station 10, the source base station 10 may send the UE information of the UE in the RRC inactive state to each of the base stations within the radio notification area by the inter-base-station interface. When at least one base station within the radio notification area does not have an inter-base-station interface with the source base station 10, the source base station 10 may send a notification message to the core network device 40, so as to notify the core network device 40 to send the UE information of the UE in the RRC inactive state to all base stations within the radio notification area, or only to the at least one base station within the radio notification area which does not have the inter-base-station with the source base station 10. In this way, the source base station 10 quickly and efficiently notifies the UE information of the UE in the RRC inactive state to other base stations within the radio notification area.

In the example, by the foregoing steps 101-102, the UE information of the UE in the RRC inactive state is obtained by all the base stations within the radio notification area. Therefore, when the UE moves among cells within the radio notification area and needs to be switched to the RRC connected state, a base station associated with any one of the cells in which the UE is located may control the UE to switch to the RRC connected state with relatively less interaction signaling. In this way, the UE in the RRC inactive state is quickly and efficiently switched to the RRC connected state, thereby improving the transmission efficiency of the service data for the UE.

In an example, sending the UE information of the UE to all the base stations within the radio notification area includes:

when at least one base station within the radio notification area does not have an inter-base-station interface with the source base station, sending a first notification message to a core network device for instructing the core network device to send the UE information of the UE to all base stations within the radio notification area.

In an example, sending the UE information of the UE to all the base stations within the radio notification area includes:

when at least one base station within the radio notification area does not have an inter-base-station interface with the source base station, sending a second notification message to a core network device for instructing the core network device to send the UE information of the UE to the at least one base station; and sending the UE information of the UE to other base stations within the radio notification area except the at least one base station through inter-base-station interfaces.

In an example, sending the UE information of the UE to all the base stations within the radio notification area includes:

when each of the base stations within the radio notification area has an inter-base-station interface with the source base station, sending the UE information of the UE to each of the base stations within the radio notification area through the inter-base-station interface between the base station and the source station.

In an example, the UE information of the UE is UE identification information to identify the UE, or context information of the UE.

Detail on how to configure UE information refers to the following examples.

The technical solutions provided by examples of the present disclosure are described below by detailed description.

Figure 2:
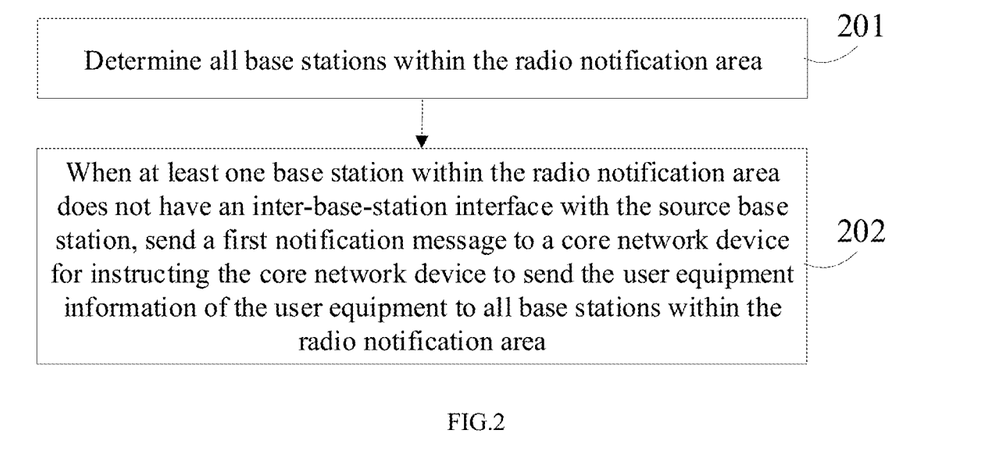
FIG. 2 is a flowchart of a method of configuring UE information according to another example.

FIG. 2 is a flowchart of a method of configuring UE information according to another example. The example uses the above methods provided by examples of the present disclosure and is illustrated by taking a method in which UE information is sent by the source base station as an example. As shown in FIG. 2, the method includes the following steps.

At step 201, all base stations within the radio notification area are determined.

In an example, the radio notification area may be first determined, and then all the base stations within the radio notification area are determined according to a method of obtaining a base station within a certain area in the related art. For example, a base station list is obtained from a core network device.

At step 202, when at least one base station within the radio notification area does not have an inter-base-station interface with the source base station, a first notification message is sent to a core network device for instructing the core network device to send the UE information of the UE to all the base stations within the radio notification area.

In an example, the inter-base-station interface may be an Xn interface, such as an X1 interface, an X2 interface, and so on.

In an example, the core network device may be a Mobility Management Entity (MME) or other network entity capable of managing UE and base stations.

In the example, by the foregoing steps 201-202, when there is no inter-base-station interface between the source base station and the at least one base station within the radio notification area, the core network device may send the UE information to all the base stations within the radio notification area. To some extent, the signaling power consumption of the source base station is reduced.

Figure 3:
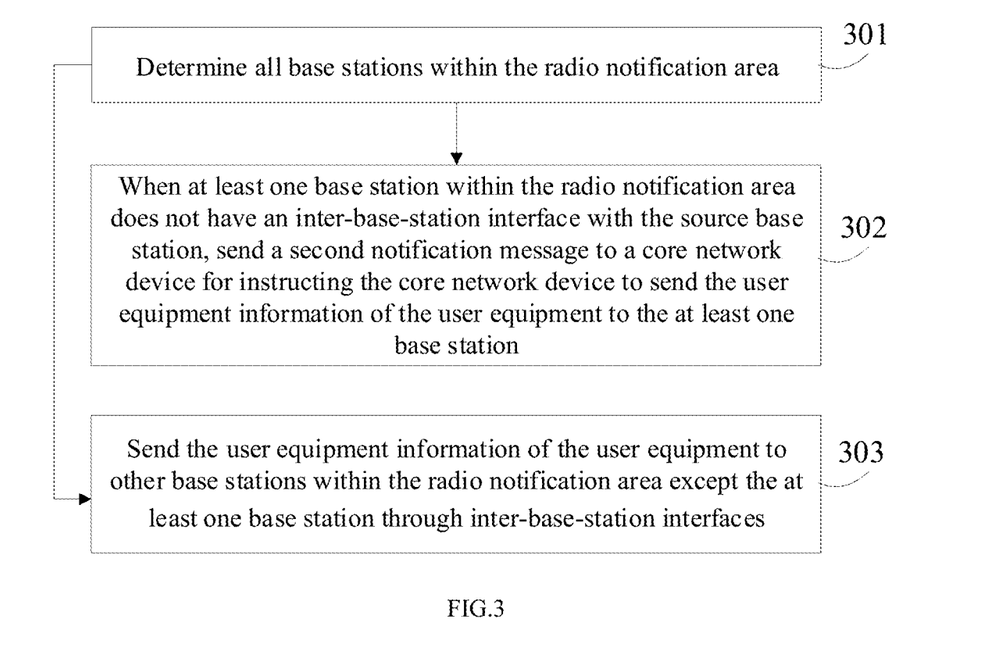
FIG. 3 is a flowchart of a method of configuring another UE information according to still another example.

FIG. 3 is a flowchart of a method of configuring UE information according to still another example. The example uses the above methods provided by examples of the present disclosure and is illustrated by taking a method in which UE information is sent by the source base station as an example. As shown in FIG. 3, the method includes the following steps.

At step 301, all base stations within the radio notification area are determined, and step 302 and step 303 are performed.

In an example, the radio notification area may be first determined, and then all the base stations within the radio notification area are determined according to a method of obtaining a base station within a certain area in the related art. For example, a base station list is obtained from a core network device.

At step 302, when at least one base station within the radio notification area does not have an inter-base-station interface with the source base station, a second notification message is sent to a core network device for instructing the core network device to send the UE information of the UE to the at least one base station.

At step 303, the UE information of the UE is sent to other base stations within the radio notification area except the at least one base station through the inter-base-station interface.

In an example, at steps 301-303, if there are six base stations within the radio notification area except the source base station, the six base stations are base station 1, base station 2, base station 3, base station 4, base station 5, and base station 6 respectively. There is no inter-base-station interface between the source base station and the base station 1, no inter-base-station interface between the source base station and base station 2, and no inter-base-station interface between the source base station and base station 3. The source base station may send a second notification message to the core network device for instructing the core network device to send the UE information of the UE to base station 1, base station 2 and base station 3. The source base station sends the UE information of the UE to base station 4, base station 5 and base station 6 through inter-base-station interfaces.

In the example, by the foregoing steps 301-303, the source base station can send the UE information to the base stations within the radio notification area in different manners according to a case whether there is an inter-base-station interface between the source base station and a base station within the radio notification area, so as to ensure that the UE information of the UE in the RRC inactive state is quickly and efficiently notified to the base stations within the radio notification area.

Figure 4:
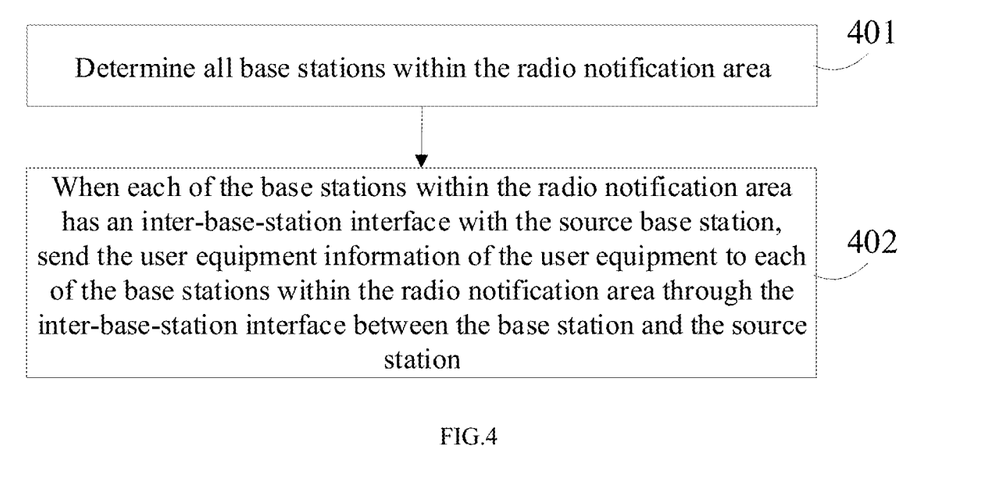
FIG. 4 is a flowchart of a method of configuring UE information according to yet another example.

FIG. 4 is a flowchart of a method of configuring UE information according to yet another example. The example uses the above methods provided by examples of the present disclosure and is illustrated by taking a method in which UE information is sent by the source base station as an example. As shown in FIG. 4, the method includes the following steps.

At step 401, all base stations within the radio notification area are determined.

In an example, the radio notification area may be first determined, and then all the base stations within the radio notification area are determined according to a method of obtaining a base station within a certain area in the related art. For example, a base station list is obtained from a core network device.

At step 402, when each of the base stations within the radio notification area has an inter-base-station interface with the source base station, the UE information of the UE is sent to each of the base stations within the radio notification area through the inter-base-station interface between the base station and the source station.

In the example, by the forgoing steps 401-402, the source base station can directly send the UE information of the UE in the RRC inactive state to each of the base stations within the radio notification area through the inter-base-station interface. In this case, the core network device is not used, interaction signaling is reduced and time is shortened.

Figure 5:
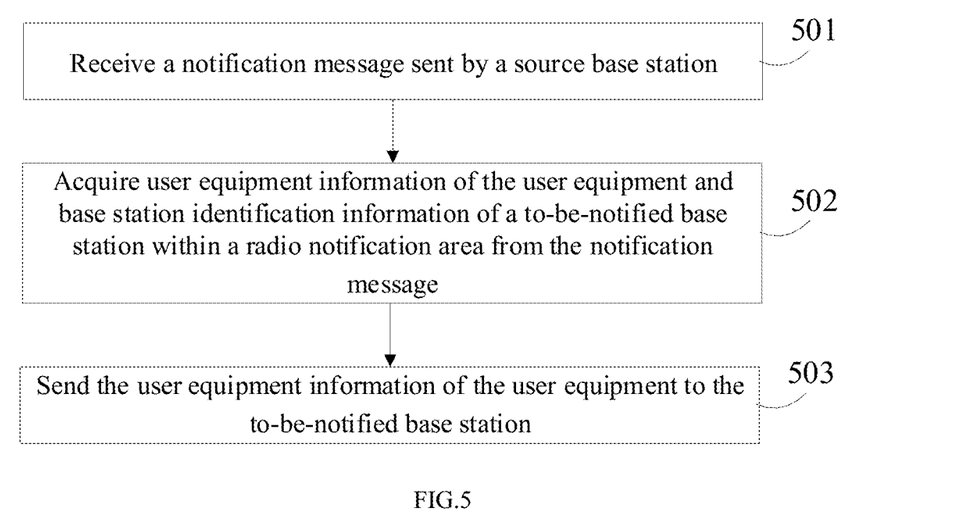
FIG. 5 is a flowchart of a method of configuring UE information of UE according to an example.

FIG. 5 is a flowchart of a method of configuring UE information of UE according to an example. The method of configuring UE information may be applied to a core network device. As shown in FIG. 5, the method of configuring UE information may include the following steps 501-503.

At step 501, a notification message sent by a source base station is received.

At step 502, UE information of UE and base station identification information of a to-be-notified base station within a radio notification area is acquired from the notification message.

In an example, the radio notification area is used to indicate a set of one or more cells, and the UE in the RRC inactive state moving among the cells in the radio notification area does not cause a cell handover.

In an example, the UE information of the UE may be identification information of the UE, such as an IMSI of the UE.

In an example, the UE information of the UE may also be context information of the UE, including but not limited to any one or more of the following: a capability of the UE, authentication information, a negotiated security algorithm, a generated key, created connection information, bearer information, and so on.

At step 503, the UE information of the UE is sent to the to-be-notified base station.

In an exemplary scenario, as shown in FIG. 1B, take a mobile network being the 5G network as an example for illustration. The scenario shown in FIG. 1B includes a source base station 10, UE 20, base stations 30, 31, . . . , 3N within a radio notification area and a core network device 40. When the UE corresponding to the source base station 10 is switched to the RRC inactive state, the source base station 10 may determine a radio notification area for the UE. When at least one base station within the radio notification area does not have an inter-base-station interface with the source base station 10, the source base station 10 may send a notification message to the core network device 40, so as to notify the core network device 40 to send the UE information of the UE in the RRC inactive state to all base stations within the radio notification area, or only to the at least one base station within the radio notification area which does not have the inter-base-station with the source base station 10. In this way, the source base station 10 quickly and efficiently notifies the UE information of the UE in the RRC inactive state to other base stations within the radio notification area.

In the example, by the foregoing steps 501-503, the UE information of the UE in the RRC inactive state is obtained by all the base stations within the radio notification area. Therefore, when the UE moves among cells within the radio notification area and needs to be switched to the RRC connected state, a base station associated with any one of the cells in which the UE is located may control the UE to switch to the RRC connected state with relatively less interaction signaling. In this way, the UE in the RRC inactive state is quickly and efficiently switched to the RRC connected state, thereby improving the efficiency of the service data transmitted by the UE.

Figure 6:
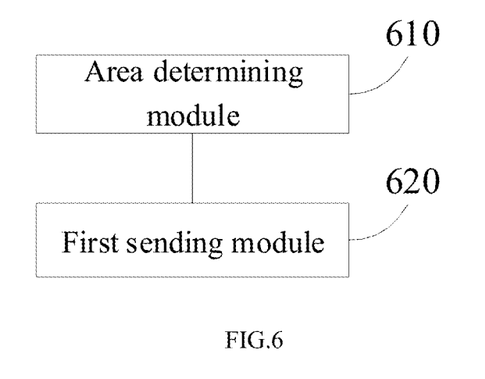
FIG. 6 is a block diagram of an apparatus for configuring UE information according to an example.

FIG. 6 is a block diagram of an apparatus for configuring UE information according to an example. The apparatus is applied to a source base station. As shown in FIG. 6, the apparatus for configuring UE information includes:

an area determining module 610, configured to configured to determine a radio notification area after UE is controlled to transit from an RRC connected state to an RRC inactive state, where the radio notification area is used to indicate a set of one or more cells and the UE in the RRC inactive state moving among the cells in the radio notification area does not cause a cell handover; and a first sending module 620, configured to send UE information of the UE to all base stations within the radio notification area.

Figure 7:
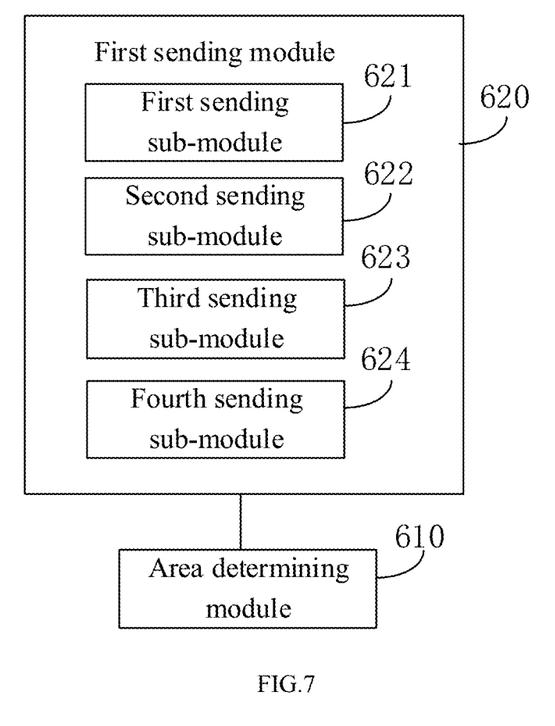
FIG. 7 is a block diagram of an apparatus for configuring UE information according to another example.

FIG. 7 is a block diagram of an apparatus for configuring UE information according to another example. As shown in FIG. 7, on the basis of the foregoing example shown in FIG. 6, in an example, the first sending module 620 includes:

a first sending sub-module 621, configured to send a first notification message to a core network device for instructing the core network device to send the UE information of the UE to all base stations within the radio notification area when at least one base station within the radio notification area does not have an inter-base-station interface with the source base station.

In an example, the first sending module 620 includes:

a second sending sub-module 622, configured to send a second notification message to a core network device for instructing the core network device to send the UE information of the UE to at least one base station when the at least one base station within the radio notification area does not have an inter-base-station interface with the source base station; and a third sending sub-module 623, configured to send the UE information of the UE to other base stations within the radio notification area except the at least one base station through inter-base-station interfaces.

In an example, the first sending module 620 includes:

a fourth sending sub-module 624, configured to, when each of the base stations within the radio notification area has an inter-base-station interface with the source base station, send the UE information of the UE to each of the base stations within the radio notification area through the inter-base-station interface between the base station and the source station.

In an example, the UE information of the UE is UE identification information to identify the UE, or context information of the UE.

Figure 8:
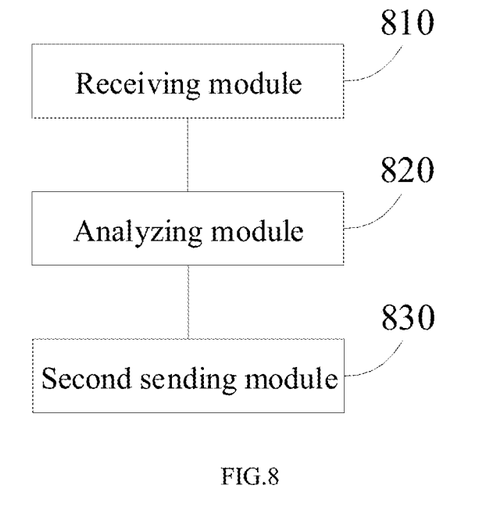
FIG. 8 is a block diagram of an apparatus for configuring UE information according to an example.

FIG. 8 is a block diagram of an apparatus for configuring UE information according to an example. The apparatus is applied to a core network device. As shown in FIG. 8, the apparatus for configuring the UE information includes:

a receiving module 810, configured to receive a notification message sent by a source base station;

an analyzing module 820, configured to acquire UE information of UE and base station identification information of a to-be-notified base station within a radio notification area from the notification message, where the radio notification area is used to indicate a set of one or more cells, and the UE in an RRC inactive state moving among the cells in the radio notification area does not cause a cell handover; and a second sending module 830, configured to send the UE information of the UE to the to-be-notified base station.

In an example, the UE information of the UE is UE identification information to identify the UE, or context information of the UE.

For the apparatuses in the above examples, the specific manner in which the respective modules perform the operations has been described in detail in the examples relating to the method, and will not be explained in detail herein.

Figure 9:
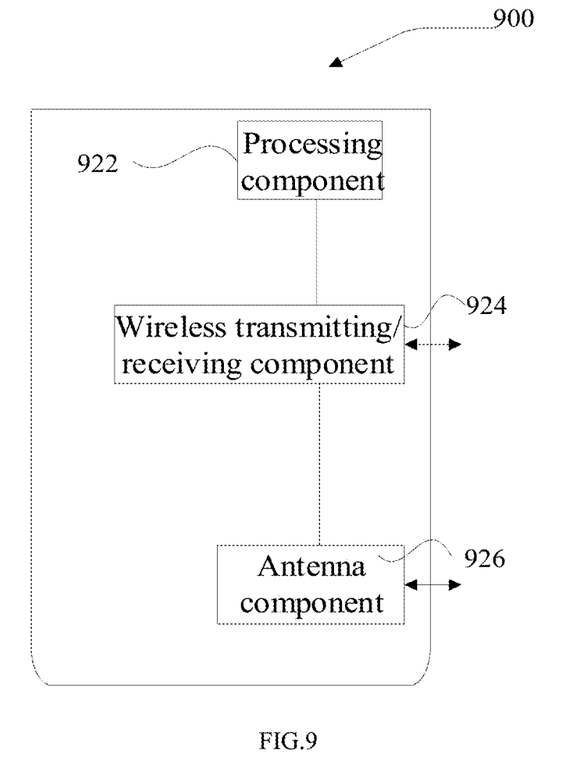
FIG. 9 is a block diagram of a device suitable for configuring UE information according to an example.

FIG. 9 is a block diagram of a device suitable for configuring UE information according to an example. The device 900 may be provided as a base station. Referring to FIG. 9, the device 900 includes a processing component 922, a wireless transmitting/receiving component 924, an antenna component 926, and a signal processing portion specific to the wireless interface. The processing component 922 may further include one or more processors.

A processor in the processing components 922 may be configured to:

after UE is controlled to switch from an RRC connected state to an RRC inactive state, determine a radio notification area, where the radio notification area is used to indicate a set of one or more cells and the UE in the RRC inactive state moving among the cells in the radio notification area does not cause a cell handover; and send UE information of the UE to all base stations within the radio notification area.

A specific structure applicable to a core network device may refer to the corresponding description, which will not be described in detail herein.

The core network device may include a processing component. A processor in the processing component may be configured to:

receive a notification message sent by a source base station;

acquire UE information of UE and base station identification information of a to-be-notified base station within a radio notification area from the notification message, where the radio notification area is used to indicate a set of one or more cells, and the UE in a Radio Resource Control (RRC) inactive state moving among the cells in the radio notification area does not cause a cell handover; and send the UE information of the UE to the to-be-notified base station.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of configuring User Equipment (UE) information, comprising:

determining, by a source base station, a radio notification area, after a UE switching from a Radio Resource Control (RRC) connected state to an RRC inactive state, wherein the radio notification area indicates a set of a plurality of cells, and wherein the UE in the RRC inactive state moving among the cells in the radio notification area does not cause a cell handover; and sending, by the source base station, the UE information of the UE to all base stations within the radio notification area, wherein sending the UE information of the UE to all the base stations within the radio notification area comprises:

determining, by the source base station, all other plurality of base stations within the radio notification area except for the source base station; and when at least one of all the other plurality of base stations within the radio notification area does not have an inter-base-station interface with the source base station, sending, by the source base station, a first notification message to a core network device for instructing the core network device to send the UE information of the UE to all the other plurality of base stations within the radio notification area.

2. The method according to claim 1, wherein the UE information of the UE is:

UE identification information for identifying the UE, or context information.

3. A source base station, comprising:

a processor; and a memory configured to store processor-executable instructions;

wherein the processor is configured to:

determine a radio notification area, after a User Equipment (UE) switching from a Radio Resource Control (RRC) connected state to an RRC inactive state, wherein the radio notification area indicates a set of a plurality of cells, and wherein the UE in the RRC inactive state moving among the cells in the radio notification area does not cause a cell handover; and send UE information of the UE to all base stations within the radio notification area, wherein sending the UE information of the UE to all the base stations within the radio notification area comprises:

determining all other plurality of base stations within the radio notification area except for the source base station; and when at least one of all the other plurality of base stations within the radio notification area does not have an inter-base-station interface with the source base station, sending a first notification message to a core network device for instructing the core network device to send the UE information of the UE to all the other plurality of base stations within the radio notification area.

4. The base station according to claim 3, wherein the UE information of the UE is:

UE identification information for identifying the UE, or context information.

5. A core network device, comprising:

a processor; and a memory configured to store processor-executable instructions;

wherein the processor is configured to:

receive a notification message sent by a source base station, wherein the notification message is sent when at least one of all other plurality of base stations within a radio notification area except for the source base station does not have an inter-base-station interface with the source base station, all the other plurality of base stations within the radio notification area are determined by the source base station, the notification message instructs the core network device to send User Equipment (UE) information of a UE to all the other plurality of base stations within the radio notification area, and the radio notification area indicates a set of a plurality of cells, and wherein the UE in a Radio Resource Control (RRC) inactive state moving among the cells in the radio notification area does not cause a cell handover;

acquire the UE information of the UE and base station identification information of all the other plurality of base stations within the radio notification area from the notification message; and send the UE information of the UE to all the other plurality of base stations within the radio notification area.

6. The core network device according to claim 5, wherein the UE information of the UE is:

UE identification information for identifying the UE, or context information.

7. The method according to claim 2, wherein the context information comprises at least one of:

a capability of the UE,
authentication information,
a negotiated security algorithm,
a generated key,
created connection information, or
bearer information.

8. The base station according to claim 4, wherein the context information comprises at least one of:

a capability of the UE,
authentication information,
a negotiated security algorithm,
a generated key,
created connection information, or
bearer information.

9. The core network device according to claim 6, wherein the context information comprises at least one of:

a capability of the UE,
authentication information,
a negotiated security algorithm,
a generated key,
created connection information, or
bearer information.

* * * * *